United States Patent [19]
Naoi et al.

[11] Patent Number: 5,792,575
[45] Date of Patent: Aug. 11, 1998

[54] LITHIUM SULFUR SECONDARY BATTERY AND ELECRODE MATERIAL FOR A NON-AQUEOUS BATTERY

[75] Inventors: Katsuhiko Naoi, Tokyo; Takitaro Yamaguchi, Shizuoka; Akihiko Torikoshi, Shizuoka; Hiroshi Iizuka, Shizuoka, all of Japan

[73] Assignee: Yazaki Corporation, Tokyo, Japan

[21] Appl. No.: 711,853

[22] Filed: Sep. 10, 1996

[30] Foreign Application Priority Data

Sep. 11, 1995 [JP] Japan ............................... 7-232767
Sep. 11, 1995 [JP] Japan ............................... 7-232768

[51] Int. Cl.$^6$ ............................................. H01M 4/02
[52] U.S. Cl. ................................... 429/213; 429/104
[58] Field of Search .............................. 429/104, 212, 429/213, 218

[56] References Cited

U.S. PATENT DOCUMENTS

| | | | |
|---|---|---|---|
| 4,358,515 | 11/1982 | Joshi et al. | 429/191 |
| 5,324,599 | 6/1994 | Oyama et al. | 429/192 |
| 5,413,882 | 5/1995 | Uemachi et al. | 429/213 |
| 5,460,905 | 10/1995 | Skotheim | 429/213 |
| 5,462,566 | 10/1995 | Skotheim | 29/623.1 |

FOREIGN PATENT DOCUMENTS 4-359865  12/1992  Japan .

*Primary Examiner*—M. Nuzzolillo
*Attorney, Agent, or Firm*—Finnegan, Henderson, Farabow, Garrett & Dunner, L.L.P.

[57] ABSTRACT

A lithium sulfur secondary battery is provided with a cathode containing a highly basic polymer compound in a composition or in a form of a film. The lithium sulfur secondary battery gives a longer cyclic life of charging/discharging and high energy density.

68 Claims, 2 Drawing Sheets

LITHIUM SULFUR SECONDARY BATTERY AND ELECRODE MATERIAL FOR A NON-AQUEOUS BATTERY

BACKGROUND OF THE INVENTION

1. Field of the Invention

The present invention relates to a lithium secondary battery containing a positive electrode (hereinafter referred to as a "cathode") active material of a sulfide-series compound.

2. Description of the Prior Art

Generally, a sulfide-series compound such as an organic disulfide compound has a property as described below. A sulfur-sulfur combination in this compound is cleaved by electrolytic reduction to generate a sulfur-lithium ion combination which is in turn split to create the inherent sulfur-sulfur combination. Such a property of the sulfide-series compound can give high energy when it is used as cathode active material.

A lithium secondary battery containing the sulfide-series compound as a cathode active material (hereinafter referred to as "lithium sulfur secondary battery") provides very slow movement of electrons because of the property of the cathode active material. For this reason, in order to take out a practical current, the battery must be heated at about 60° and hence its application was limited.

The sulfide-series compounds are soluble in an electrolytic solution (nonaqueous solvent) which is used in the lithium-series secondary battery. It was difficult to use an organic electrolyte in which lithium acid is solved in a nonaqueous solvent, and so it was necessary to use a solid or gelled electrolyte such as a polymer electrolyte.

The sulfide-series compound, which provides low electron conductivity, was used as a composition mixed with a conductive material such as graphite powder and a solid polyelectrolyte. Such a composition cannot also create a network of electrons and ions, thus disadvantageously resulting in great polarization.

As a means of solving these problems, a proposal has been made in which activated carbon carrying a sulfide-series compound and polyaniline serving as an electrode catalyst and conductive material are used as a cathode active material (JP-A-4-359865). Such a structure can increase the speed of oxidation and reduction of the cathode active material, which permits charging/discharging at a large current at room temperatures.

This proposal has a disadvantage that a cyclic life of charging/discharging will be extremely shortened if the ratio of sulfides to aniline units (the aniline of one unit in the polyaniline is referred to as an "aniline unit") contained in the activated carbon is 1 or more (see "NATIONAL TECHNICAL REPORT Vol. 40, pages 464–469, August 1994). This is attributable to the fact that in the electrode in a discharged state, the number of sulfides which can be trapped by one aniline unit is 1 or so. Thus, in order to improve the cycle life, the ratio of the sulfides to the aniline units must be set for 1 or so. This makes it difficult to improve the energy density per unit weight.

SUMMARY OF THE INVENTION

An object of the present invention is to provide an excellent lithium sulfur secondary battery with a longer cycle life of charging/discharging and high energy density.

In order to attain the above object, in accordance with the first aspect of the present invention, there is provided a lithium sulfur secondary battery containing a highly basic polymer compound in a composition constituting a cathode.

In accordance with the second aspect of the present invention, there is provided a lithium sulfur secondary battery including a film of a highly basic polymer in its cathode.

The lithium sulfur secondary battery according to the present invention provides the following advantages in comparison to a conventional secondary battery.

In the conventional secondary battery, there is much lithium thiorate moving outside a cathode through diffusion during discharging. During charging, this lithium thiorate cannot return to the cathode and is oxidized outside the cathode to result in a massive polymer which will deposit in an interface between electrolyte and an electrode. The massive polymer does not significantly contribute to charging/discharging and does not serve as an active material. Repetition of charging/discharging will increase such massive polymers and hence reduce the capacity of charging/discharging.

On the other hand, the highly basic polymer compound used in the present invention, which is more highly basic than the polyaniline series compound used conventionally, can substantially completely prevent separation of lithium thiorates created during discharging from the cathode. Since the acidity of the lithium thiorate is relatively low, increasing the basicity of the cathode according to the present invention leaves many thiorates trapped within the cathode.

Because of the above action, the lithium secondary battery provided with a cathode according to the present invention can set the number of trapped sulfides per one basic unit at 1 or more. This improves the energy density per one unit weight and increases the cyclic life of charging/discharging.

In the secondary battery according to the present invention, lithium thiorates created during discharging will not separate from the cathode so that the electrolyte is not limited to a solid or gelled electrolyte. Accordingly, the present invention can provide a secondary battery with an excellent charging/discharging property at a large current.

The above and other objects and features of the present invention will be more apparent from the following description taken in conjunction with the accompanying drawings.

DETAILED DESCRIPTION OF THE PREFERRED EMBODIMENTS

Figure 1:
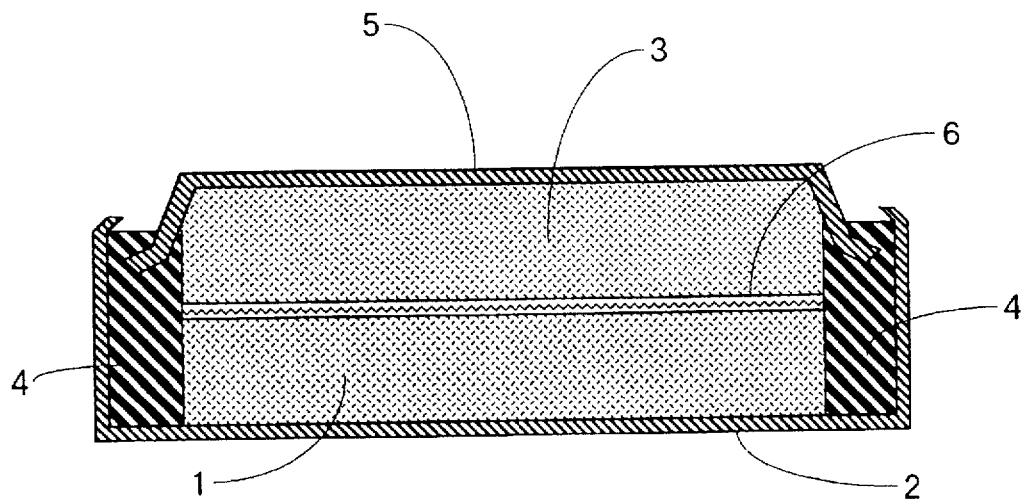
FIG. 1 is a sectional view of a lithium sulfur secondary battery according to the present invention.

First, it should be noted that the highly basic polymer compound in the present invention refers to a polymer compound having a basic group such as an amino group. The polymer compound includes a polyvinyl-series compound and a polyacetylene-series polymer compound.

The above polyvinyl-series polymer compound is easily available and also easily polymerized from a raw material.

This polymer basic group is arranged three-dimensionally from a main chain and hence has a large space capable of trapping more lithium thiorates (Where sulfide is trapped in polyaniline used conventionally, it is held two-dimensionally because of the structure of polyaniline).

The highly basic polymer compound used in the present invention is electrically conductive and hence does not require application of conductive fillers in forming an electrode.

The highly basic polymer compound will be more concretely explained below. For example, the polyvinyl-series polymer compound can be expressed by a general chemical formula:

—(CH$_2$—CHX)$_n$—

The polyvinyl-series polymer compound at issue can be admitted to be a highly basic polymer compound if X in the formula is a basic group such as an amino group (NH$_2$—), aminomethyl group (NH$_2$CH—), an aminoethyl group (NH$_2$CH$_2$CH$_2$—, CH$_3$CH(NH$_2$)—), an amino-n-bythyl group (NH$_2$CH$_2$CH$_2$CH$_2$—, CH$_3$CH(NH$_2$)CH$_2$, CH$_3$CH$_2$CH(NH$_2$)—), a methyaminomethyl group (CH$_3$NHCH$_2$—), an aminophenyl group (isomers of NH$_2$C$_6$H$_4$—), an aminomethylphenyl group (isomers of C$_6$H$_3$(CH$_3$)(NH$_2$)—), an aminobenzyl group (isomers of NH$_2$C$_6$H$_4$CH$_2$—), a pyridyl group (isomers of NC$_5$H$_4$), a hydrazino group (NH$_2$NH—), or an oxopyrrolidinyl group (isomers of NOC$_4$H$_6$).

The polyacetylene-series polymer compound can be expressed by a general chemical formula:

—(CH$_2$=CX—)$_n$—

The polyacetylene-series polymer compound can also be admitted to be a highly basic polymer compound if X in the formula is the same basic group as listed above in connection with the polyvinyl-series polymer compound.

In the first aspect of the present invention, these highly basic polymer compounds can be used to make a cathode in any state of powder, grain, fiber, etc. Specifically, the highly basic polymer compound in one of these states is mixed with a sulfide compound which is an active material, such as the sulfide compound and a conductive material, and formed into the cathode by means of e.g. compression molding.

Where the highly basic polymer compound is thermoplastic, it can be formed into an electrode by means of heat molding. The thermoplastic resin mixed with the electrode material may be heat molded.

The above cathode can provide the greatest advantage in view of the energy density when it is applied to a lithium second battery having a negative electrode (hereinafter referred to as "cathode") of light lithium. It may be applied to a non-aqueous solvent secondary battery provided with a cathode of materials other than lithium.

The sulfide compound serving as an active material includes a disulfide compound used commonly, a polysulfide compound having two or more successive sulfur-sulfur combinations, etc. When the polysulfide compound is used as an active material, the energy density per unit weight can be increased. For this reason, in combination with the present invention, a very high energy density per unit weight can be obtained.

The conductive material may be a material such as furnace black which commonly gives conductivity. The material commercially available as "KETCHEN BLACK" gives high conductivity and can be easily handled. The conductive material is preferably powdery to provide workability in mixing.

The electrolytic solution used in the lithium secondary battery according to the present invention is adjusted in combination of organic solvent and electrolyte. Since it is not necessary to limit the electrolyte to a solid electrolyte and a gelled electrolyte, its freedom of selection is very high. The organic solvent and electrolyte may be any combination as long as they are used in a common non-aqueous battery. Specifically, the organic solvent may be propylene carbonate; ethylene carbonate; 1, 2-dimethoxy ethane; 1, 2-diethoxyethane; γ-butyrolactone; tetrahydrofuran (THF); 1, 3-dioxolane; 4-methyl-1, 3-dioxolane; diethyl ether; sulfolane; acetonitrile; propionitrile; anisole, etc. alone or in mixture.

The substance such as LiPF$_6$, LiClO$_4$, LiAsF$_6$, LiBF$_4$, LiCF$_3$SO$_3$, etc. can be used for the electrolyte. Such a substance is solved in the organic solvent so as to have an appropriate density to form the electrolyte.

The anode may be an electrode commonly used for the lithium secondary battery. Specifically, the cathode may be made of metallic lithium, a lithium-aluminum alloy, or an intercalation complex of lithium and graphite or carbon.

These components, i.e., cathode, electrolyte and anode are combined to form a battery which can take any shape such as a flat, cylindrical or square shape.

On the other hand, in the second aspect of the present invention, a film made of these highly basic polymer compounds in the cathode can be formed on the cathode of an electrode material by electrolytic polymerization. The electrolytic polymerization is disclosed in J. Electrochem. Soc., Vol. 139, No. November 1992, pages. 3090-3097.

The highly basic polymer may not be formed on the surface of the cathode material from a monomer. Alternatively, a powdery highly basic polymer compound made previously may be applied to the surface of the cathode material and fused to form its film. Further, the film may be formed in such a manner that an electrode material is immersed in the highly basic polymer and pulled up and cooled.

It should be noted that electrolytic polymerization permits a uniform film of the highly basic polymer compound to be formed and its thickness to be easily controlled.

The cathode material may be any material as long as it is not changed in quality in accordance with an electrolytic solution and a material of the anode, and can be selected from the group consisting of gold (Au), platinum (Pt), silver (Ag), nickel (Ni), titanium (Ti), glassy-carbon, palladium (Pd), copper (Cu), iron (Fe), indium (In), tungsten (W) and graphite. Of these materials, graphite which is light in weight and high in electric conductivity, is preferably used.

In the second aspect of the present invention, the same electrolytic solution and anode as in the first aspect can be used.

Embodiments based on the first aspect of the present invention:

EXAMPLE 1

Making a cathode:

Using a mixer, mixed are 2, 5-dimethylcapto-1, 3, 4-thiadiazole of 70 weight % (available from Kanto Chemical Co. Inc), poly-4 vinylpyridine serving as basic polyvinylpyridine (Aldoridge Co. Ltd.) of 25 weight % and KETCHEN BLACK furnace black serving as a conductive material of 5 weight %. Using a press machine, the mixture is press-molded. The mold thus formed is dried in vacuum for 24 hours at 50° C., thus providing an electrode having a diameter of 21 mm and a thickness of 3.5 mm.

Assembling a battery:

The electrode thus formed is used as a cathode; a lithium metallic plate is used as an anode; and lithium perchlorate is solved in a mixed solution of equal amounts of propylenecarbonate and 1, 2-dimethoxyethane to be 1 mol/l as an electrolytic solution.

Using these components, battery A is assembled. The section of the battery A is shown in FIG. 1. As seen from FIG. 1, one main surface of cathode 1 is abutted on the internal face of a cathode can 2, whereas the other surface thereof is opposite to one main surface of an anode 3 (having a thickness of 1 m) through a separator 6 made of, preferably, polypropylene non-woven fabric. The other surface of the anode 3 is abutted on an anode can 5. An insulating packing 4 made of polypropylene is secured to the inner wall of the cathode can 2 so that the cathode 1 and the anode 3 are not brought into contact with the anode can 5 and the cathode can 1, respectively. The packing 4 also makes the interior of the battery A airtight from outside. Incidentally, it should be noted that the battery was assembled entirely in an argon box in order to obviate reaction of lithium with water, nitride and oxygen.

Figure 2:
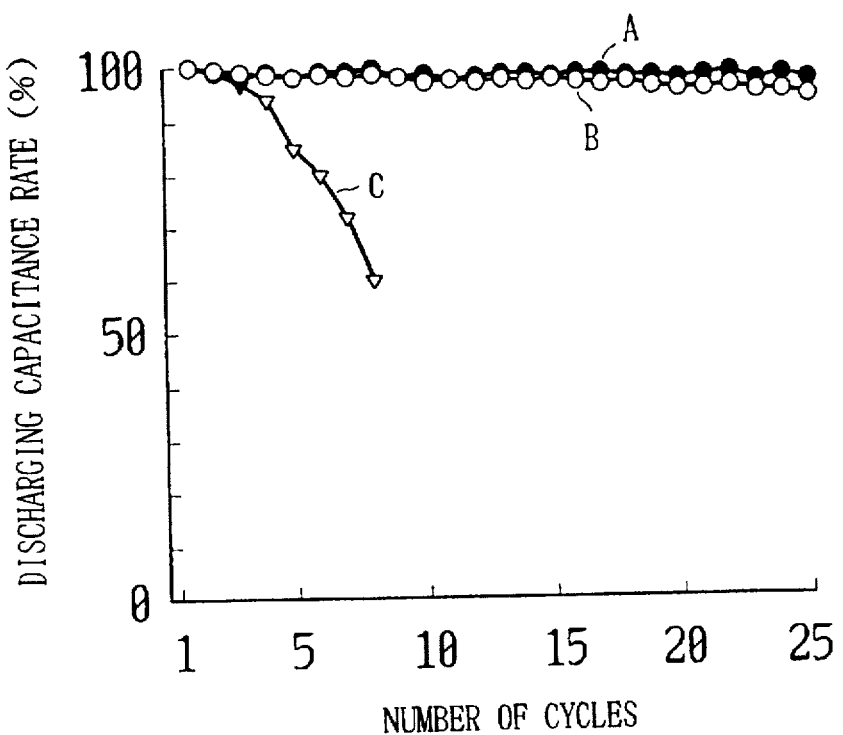
FIG. 2 is a graph showing changes in the discharging capacity rate when charging/discharging is repeated in the batteries according to embodiments based on the first aspect of the present invention and a comparative example.

Evaluation:

Evaluation of charging/discharging was made for the battery A. Both charging and discharging were carried out at a constant current of 20 mA, for 10 hours for the charging and until the voltage lowers to 2.0 V for discharging. Assuming that the discharging capacitance rate carried out in the first cycle is 100%, FIG. 2 shows a relationship between the number of cycles and the discharging capacitance rate. It can be understood from the graph of FIG. 2 that the discharging capacitance at the first charging/discharging cycle is substantially maintained at the 25-th charging/discharging cycle.

EXAMPLE 2 AND COMPARATIVE EXAMPLE:

As example 2, a battery B has been fabricated so as to have entirely the same composition and structure as the battery A except that as a highly basic polymer compound, polyvinyl pyrrolidone (powdery: available from Aldoridge Co. Ltd.) is adopted instead of poly-4-vinylpyridine in Example 1.

As a comparative example, a battery C has been fabricated so as to have the same composition and structure as the battery A except that as a high basic polymer compound, polyaniline (powdery: available from Nitto Denko Co. Ltd.) is adopted instead of poly-4-vinylpyridine in Example 1.

The results of evaluation of the charging/discharging cycle for these batteries B and C are also shown in the graph of FIG. 2.

It can also be understood from the graph of FIG. 2 that at the 25-th charging/discharging cycle, the battery B according to Example 2 gives a discharging capacitance not substantially lowered from the initial capacitance like the battery A, whereas at the 8-th or so charging/discharging cycle, the battery C according to the comparative example gives a discharging capacitance greatly lowered from the initial capacitance.

These batteries A, B and C contain equal amounts of active material and ratios of the sulfide (active material) and the basic unit of 2.5 or more, respectively. The using rate of the sulfides, i.e., the rate of active material having participated in the 7-th discharging cycle of the contained entire active material (which is calculated in terms of the discharging capacitance) was 1.5: 1.5: 1.0 for the batteries A, B and C. This shows that the lithium sulfur secondary battery according to the present invention can have a high energy density.

Embodiment based on the second aspect of the present invention

EXAMPLE 3

1. Making a cathode:

(a) Forming a polyvinylpyridine film

Disk-Shaped graphite (having a diameter of 20 mm and a thickness of 1 mm) was used as an electrode material. A polyvinylpyridine film was formed on the surface of the graphite by the electrolytic polymerization technique.

Specifically, in a sulfuric acid (pH=5.0) water solution in which 4-vinylpyridine and ammonium perchlorate are solved with a concentration of 0.5 mol/l and 0.1 mol/l, electrolysis is carried out at a constant voltage of −1.0 V for a silver or silver chloride electrode, thereby forming a polyvinylpyridine film on the surface of the graphite. This film was fixed by heat treatment at 125° C. for 1 hour. The surface of the graphite was analyzed by FT-IR to confirm the presence of polyvinylpyridine. Hereinafter, the graphite plate on which the polyvinylpyridine film was formed is referred to as a "filmed graphite electrode".

(b) Carrying Active Material

The active material was carried with the above filmed graphite electrode as follows.

Lithium perchlorate is solved in an equivalent mixed solution of propylenecarbonate and 1, 2-dimethoxyethane to be 1 mol/l as an electrolytic solution.

Within the electrolyte solution, the above filmed graphite electrode is electrolyzed at a constant potential of 0.7 V for the silver/ silver chloride, and the sulfide compound was carried into the polyvinylpyridine film on the filmed graphite electrode.

2. Assembling a battery:

Using the filmed graphite electrode with the sulfide compound thus carried as a cathode, a battery D was assembled in the same manner as in the first aspect of the present invention.

Figure 3:
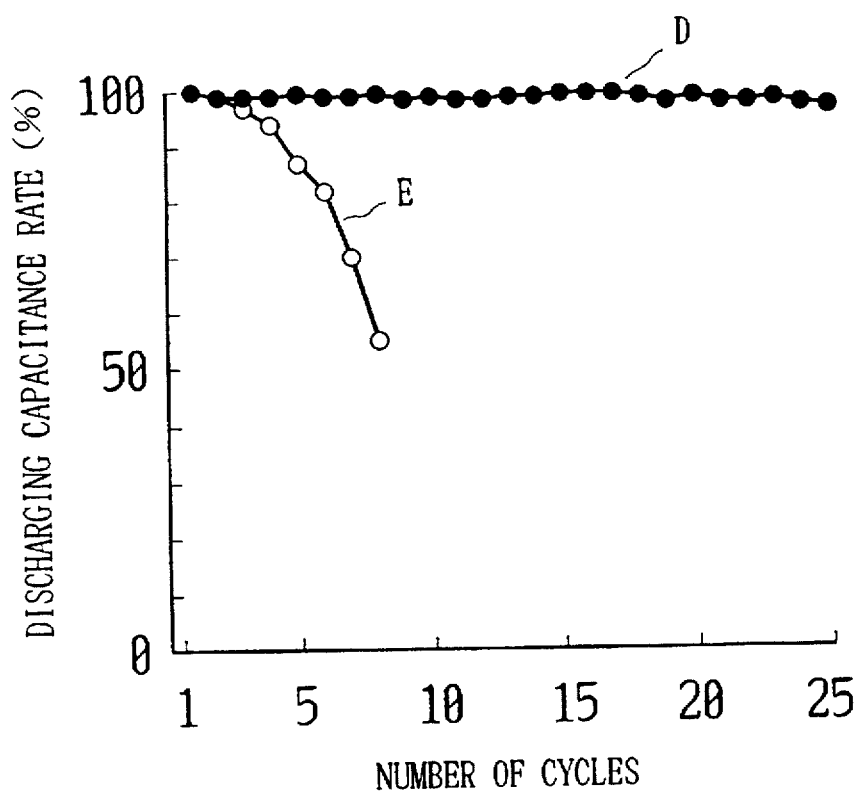
FIG. 3 is a graph showing changes in the discharging capacity rate when charging/discharging is repeated in the batteries according to embodiments based on the first aspect of the present invention and a comparative example.

3. Evaluation:

Evaluation of charging/discharging was made for the battery D. Both charging and discharging were carried out at a constant current of 20 mA, for 10 hours for the charging and until the voltage lowers to 2.0 V for discharging. Assuming that the discharging capacitance rate carried out in the first cycle is 100%, FIG. 3 shows a relationship between the number of cycles and the discharging capacitance rate. It can be understood from the graph of FIG. 3 that the discharging capacitance at the first charging/discharging cycle is substantially maintained at the 25-th charging/discharging cycle.

COMPARATIVE EXAMPLE 2

As a comparative example 2, a battery E has been fabricated so as to have the same composition and structure as the battery A except that as a high basic polymer compound, polyaniline is adopted instead of 4-vinylpyridine in Example 3.

The result of evaluation of the charging/discharging cycle for the battery E also shown in the graph of FIG. 3.

It can also be understood from the graph of FIG. 3 that at the 8-th or so charging/discharging cycle, the battery E according to the comparative example gives a discharging capacitance greatly lowered from the initial capacitance.

These batteries D and E contain equal amounts of active material and ratios of the sulfide (active material) to the basic unit of 2.5 or more, respectively. The using rate of the sulfides, i.e., the rate of active material having participated in the 7-th discharging cycle of the contained entire active material (which is calculated in terms of the discharging capacitance) was 1.5: 1.0 for the batteries D and E. This shows that the lithium sulfur secondary battery according to the present invention can have a high energy density.

What is claimed is:

1. A lithium sulfur secondary battery comprising:

a cathode containing a sulfide compound as an active material and a basic polymer compound;

an anode opposite to said cathode, said anode containing lithium; and a separator separating said anode and said cathode.

2. A lithium sulfur secondary battery according to claim 1, wherein said basic polymer compound is a polyvinyl compound.

3. A lithium sulfur secondary battery comprising:

a cathode containing a sulfide compound as an active material and a basic polymer compound, wherein said basic polymer compound is a polyacetylene compound;

an anode opposite to said cathode, said a node containing lithium; and a separator separating said anode and said cathode.

4. A lithium sulfur secondary battery according to claim 1, wherein said cathode contains a powdery conductive material in its composition.

5. A lithium sulfur secondary battery according to claim 2, wherein said cathode contains a powdery conductive material in its composition.

6. A lithium sulfur secondary battery according to claim 3, wherein said cathode contains a powdery conductive material in its composition.

7. A lithium sulfur secondary battery according to claim 2, wherein said polyvinyl compound is expressed by a general chemical formula:

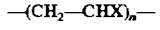

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methyaminomethyl group ($CH_3NHCH_2$—), an aminophenyl group (isomers of $NH_2C_6H_4$—), an aminomethylphenyl group (isomers of $C_6H_3(CH_3)(NH_2)$—), an aminobenzyl group (isomers of $NH_2C_6H_4CH_2$—), a pyridyl group (isomers of $NC_5H_4$), a hydrazino group ($NH_2NH$—), and an oxopyrrolidinyl group (isomers of $NOC_4H_6$).

8. A lithium sulfur secondary battery according to claim 3, wherein said polyacetylene compound is expressed by a general chemical formula:

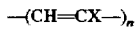

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methyaminomethyl group ($CH_3NHCH_2$—), an aminophenyl group (isomers of $NH_2C_6H_4$—), an aminomethylphenyl group (isomers represented by chemical formula $C_6H_3(CH_3)(NH_2)$—), an aminobenzyl group (isomers of $NH_2C_6H_4CH_2$—), a pyridyl group (isomers of $NC_5H_4$), a hydrazino group ($NH_2NH$—), and an oxopyrrolidinyl group (isomers of $NOC_4H_6$).

9. A lithium sulfur secondary battery according to claim 5, wherein said polyvinyl compound is expressed by a general chemical formula:

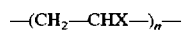

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methyaminomethyl group ($CH_3NHCH_2$—), an aminophenyl group (isomers of $NH_2C_6H_4$—), an aminomethylphenyl group (isomers of $C_6H_3(CH_3)(NH_2)$—), an aminobenzyl group (isomers of $NH_2C_6H_4CH_2$—), a pyridyl group (isomers of $NC_5H_4$), a hydrazino group ($NH_2NH$—), and an oxopyrrolidinyl group (isomers of $NOC_4H_6$).

10. A lithium sulfur secondary battery according to claim 6, wherein said polyacetylene compound is expressed by a general chemical formula:

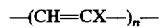

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methyaminomethyl group ($CH_3NHCH_2$—), an aminophenyl group (isomers of $NH_2C_6H_4$—), an aminomethylphenyl group (isomers of $C_6H_3(CH_3)(NH_2)$—), an aminobenzyl group (isomers of $NH_2C_6H_4CH_2$—), a pyridyl group (isomers of $NC_5H_4$), a hydrazino group ($NH_2NH$—), and an oxopyrrolidinyl group (isomers of $NOC_4H_6$).

11. A lithium sulfur secondary battery comprising:

a cathode containing a sulfide compound as an active material and a basic polymer compound, wherein said sulfide compound is selected from the group consisting of a disulfide compound and a polysulfide compound having two or more successive sulfur-sulfur bonds;

an anode opposite to said cathode, said anode containing lithium; and a separator separating said anode and said cathode.

12. A lithium sulfur secondary battery comprising:

a cathode containing a sulfide compound as an active material and a basic polymer compound, wherein said sulfide compound is selected from the group consisting of a disulfide compound and a polysulfide compound having two or more successive sulfur-sulfur bonds, and wherein said basic polymer compound is a polyvinyl compound;

an anode opposite to said cathode, said anode containing lithium; and a separator separating said anode and said cathode.

13. A lithium sulfur secondary battery according to claim 3, wherein said sulfide compound is selected from the group consisting of a disulfide compound and a polysulfide compound having two or more successive sulfur-sulfur bonds.

14. A lithium sulfur secondary battery comprising:

a cathode containing a sulfide compound as an active material, a powdery conductive material, and a basic polymer compound, wherein said sulfide compound is selected from the group consisting of a disulfide compound and a polysulfide compound having two or more successive sulfur-sulfur bonds;

an anode opposite to said cathode, said anode containing lithium; and a separator separating said anode and said cathode.

15. A lithium sulfur secondary battery comprising:

a cathode containing a sulfide compound as an active material, a powdery conductive material, and a basic polymer compound, wherein said sulfide compound is selected from the group consisting of a disulfide compound and a polysulfide compound having two or more successive sulfur-sulfur bonds, and wherein said basic polymer compound is a polyvinyl compound;

an anode opposite to said cathode, said anode containing lithium; and a separator separating said anode and said cathode.

16. A lithium sulfur secondary battery according to claim 6, wherein said sulfide compound is selected from the group consisting of a disulfide compound and a polysulfide compound having two or more successive sulfur-sulfur bonds.

17. A lithium sulfur secondary battery according to claim 1, further comprising:

a cathode can whose internal face is in contact with a first face of said cathode;

an anode can whose internal face is in contact with a first face of said anode;

wherein the separator includes an insulating porous separator material sandwiched between second surfaces of said cathode and said anode; and wherein the secondary battery further includes an insulating packing secured to an internal wall of said cathode can for preventing said anode from contacting said cathode can.

18. A lithium sulfur secondary battery comprising:

a cathode containing a sulfide compound as an active material and a basic polymer compound;

an anode opposite to said cathode, said anode containing lithium;

a cathode can whose internal face is in contact with a first face of said cathode;

an anode can whose internal face is in contact with a first face of said anode;

a separator separating said anode and said cathode, wherein said separator includes an insulating, porous non-woven fabric material sandwiched between second surfaces of said cathode and said anode; and an insulating packing secured to an internal wall of said cathode can for preventing said anode from contacting said cathode can.

19. A battery material for a non-aqueous battery comprising:

a sulfide compound as an active material; and a basic polymer compound.

20. A battery material according to claim 19, wherein said basic polymer compound is a polyvinyl.

21. A battery material for a non-aqueous battery comprising:

a sulfide compound as an active material; and a basic polymer compound, wherein said basic polymer compound is a polyacetylene compound.

22. A battery material according to claim 19, further comprising a powdery conductive material.

23. A battery material according to claim 20, further comprising a powdery conductive material.

24. A battery material according to claim 21, further comprising a powdery conductive material.

25. A battery material according to claim 22, wherein said basic polymer compound includes a material expressed by a general chemical formula:

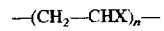

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methylaminomethyl group ($CH_3NHCH_2$—), an aminophenyl group (isomers of $NC_2C_6H_4$—), an aminomethylphenyl group (isomers of $C_6H_3(CH_3)(NH_2)$—), an aminobenzyl group (isomers of $NH_2C_6H_4CH_2$—), a pyridyl group (isomers of $NC_5H_4$), a hydrazino group ($NH_2NH$—), and an oxopyrrolidinyl group (isomers of $NOC_4H_6$).

26. A battery material according to claim 23, wherein said polyvinyl compound is expressed by a general chemical formula:

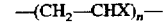

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methylaminomethyl group ($CH_3NHCH_2$—), an aminophenyl group (isomers of $NH_2C_6H_4$—), an aminomethylphenyl group (isomers of $C_6H_3(CH_3)(NH_2)$—), an aminobenzyl group (isomers of $NH_2C_6H_4CH_2$—), a pyridyl group (isomers of $NC_5H_4$), a hydrazino group ($NH_2NH$—), and an oxopyrrolidinyl group (isomers of $NOC_4H_6$).

27. A battery material according to claim 21, wherein said polyacetylene compound is expressed by a general chemical formula:

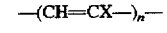

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methylaminomethyl group ($CH_3NHCH_2$—), an aminophenyl group (isomers of $NH_2C_6H_4$—), an aminomethylphenyl group (isomers represented by chemical formula $C_6H_3(CH_3)(NH_2)$—), an aminobenzyl group (isomers of $NH_2C_6H_4CH_2$—) a pyridyl group (isomers of $NC_5H_4$), a hydrazino group ($NH_2NH$—), and an oxopyrrolidinyl group (isomers of $NOC_4H_6$).

28. A battery material according to claim 24, wherein said polyacetylene compound is expressed by a general chemical formula:

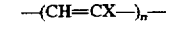

wherein X is a basic group selected from the group consisting of an amino group ($NH_2$—), an aminomethyl group ($NH_2CH$—), an aminoethyl group ($NH_2CH_2CH_2$—, $CH_3CH(NH_2)$—), an amino-n-bythyl group ($NH_2CH_2CH_2CH_2$—, $CH_3CH(NH_2)CH_2$, $CH_3CH_2CH(NH_2)$—), a methylaminomethyl group ($CH_3NHCH_2$—), an aminophenyl group (isomers of $NH_2C_6H_4$—), an aminomethylphenyl group (isomers represented by chemical formula $C_6H_3(CH_3)(NH_2)$—), an aminobenzyl group (isomers of $NH_2C_6H_4CH_2$—), a pyridyl group (isomers of $NC_5H_4$), a hydrazino group ($NH_2NH$—), and an oxopyrrolidinyl group (isomers of $NOC_4H_6$).

29. A battery material for a non-aqueous battery comprising:
 a sulfide compound as an active material, wherein said sulfide compound is selected from the group consisting of a disulfide compound and a polysulfide compound having two or more successive sulfur-sulfur bonds; and
 a basic polymer compound.

30. A battery material for a non-aqueous battery comprising:
 a sulfide compound as an active material, wherein said sulfide compound is selected from the group consisting of a disulfide compound and a polysulfide compound having two or more successive sulfur-sulfur bonds; and
 a basic polymer compound, wherein said basic polymer compound is a polyvinyl compound.

31. A battery material according to claim 21, wherein said sulfide compound is selected from the group consisting of a disulfide compound and a polysulfide compound having two or more successive sulfur-sulfur bonds.

32. A battery material for a non-aqueous battery comprising:
 a sulfide compound as an active material, wherein said sulfide compound is selected from the group consisting of a disulfide compound and a polysulfide compound having two or more successive sulfur-sulfur bonds;
 a basic polymer compound; and
 a powdery conductive material.

33. A battery material for a non-aqueous battery comprising:
 a sulfide compound as an active material, wherein said sulfide compound is selected from the group consisting of a disulfide compound and a polysulfide compound having two or more successive sulfur-sulfur bonds;
 a basic polymer compound, wherein said basic polymer compound is a polyvinyl compound; and
 a powdery conductive material.

34. A battery material according to claim 24, wherein said sulfide compound is selected from the group consisting of a disulfide compound and a polysulfide compound having two or more successive sulfur-sulfur bonds.

35. A lithium sulfur secondary battery comprising:
 a cathode including an electrode substance and a film of a basic polymer compound applied on said electrode substance, said cathode carrying a sulfide compound as an active material;
 an anode opposite to said cathode, said anode containing lithium; and
 a separator separating said anode and said cathode.

36. A lithium sulfur secondary battery according to claim 35, wherein said basic polymer compound is a polyvinyl compound.

37. A lithium sulfur secondary battery according to claim 35, wherein said basic polymer compound is a polyacetylene compound.

38. A lithium sulfur secondary battery according to claim 35, wherein said electrode substance is selected from the group consisting of gold (Au), platinum (Pt), silver (Ag), nickel (Ni), titanium (Ti), glassy-carbon, palladium (Pd), copper (Cu), iron (Fe), indium (In), tungsten (W) and graphite.

39. A lithium sulfur secondary battery according to claim 36, wherein said electrode substance is selected from the group consisting of gold (Au), platinum (Pt), silver (Ag), nickel (Ni), titanium (Ti), glassy-carbon, palladium (Pd), copper (Cu), iron (Fe), indium (In), tungsten (W) and graphite.

40. A lithium sulfur secondary battery according to claim 37, wherein said electrode substance is selected from the group consisting of gold (Au), platinum (Pt), silver (Ag), nickel (Ni), titanium (Ti), glassy-carbon, palladium (Pd), copper (Cu), iron (Fe), indium (In), tungsten (W) and graphite.

41. A lithium sulfur secondary battery according to claim 36, wherein said polyvinyl compound is expressed by a general chemical formula:

$$-(CH_2-CHX)_n-$$

wherein X is a basic group selected from the group consisting of an amino group ($NH_2-$), an aminomethyl group ($NH_2CH-$), an aminoethyl group ($NH_2CH_2CH_2-$, $CH_3CH(NH_2)-$), an amino-n-bythyl group ($NH_2CH_2CH_2CH_2-$, $CH_3CH(NH_2)CH_2$, $CH_3CH_2CH(NH_2)-$), a methyaminomethyl group ($CH_3NHCH_2-$), an aminophenyl group (isomers of $NH_2C_6H_4-$), an aminomethylphenyl group (isomers of $C_6H_3(CH_3)(NH_2)-$), an aminobenzyl group (isomers of $NH_2C_6H_4CH_2-$), a pyridyl group (isomers of $NC_5H_4$), a hydrazino group ($NH_2NH-$), and an oxopyrrolidinyl group (isomers of $NOC_4H_6$).

42. A lithium sulfur secondary battery according to claim 37, wherein said polyacetylene compound is expressed by a general chemical formula:

$$-(CH=CX-)_n-$$

wherein X is a basic group selected from the group consisting of an amino group ($NH_2-$), an aminomethyl group ($NH_2CH-$), an aminoethyl group ($NH_2CH_2CH_2-$, $CH_3CH(NH_2)-$), an amino-n-bythyl group ($NH_2CH_2CH_2CH_2-$, $CH_3CH(NH_2)CH_2$, $CH_3CH_2CH(NH_2)-$), a methyaminomethyl group ($CH_3NHCH_2-$), an aminophenyl group (isomers of $NH_2C_6H_4-$), an aminomethylphenyl group (isomers of $C_6H_3(CH_3)(NH_2)-$), an aminobenzyl group (isomers of $NH_2C_6H_4CH_2-$), a pyridyl group (isomers of $NC_5H_4$), a hydrazino group ($NH_2NH-$), and an oxopyrrolidinyl group (isomers of $NOC_4H_6$).

43. A lithium sulfur secondary battery according to claim 39, wherein said polyvinyl compound is expressed by a general chemical formula:

$$-(CH_2-CHX-)_n-$$

wherein X is a basic group selected from the group consisting of an amino group ($NH_2-$), an aminomethyl group ($NH_2CH-$), an aminoethyl group ($NH_2CH_2CH_2-$, $CH_3CH(NH_2)-$), an amino-n-bythyl group ($NH_2CH_2CH_2CH_2-$, $CH_3CH(NH_2)CH_2$, $CH_3CH_2CH(NH_2)-$), a methyaminomethyl group ($CH_3NHCH_2-$), an aminophenyl group (isomers of $NH_2C_6H_4-$), an aminomethylphenyl group (isomers of $C_6H_3(CH_3)(NH_2)-$), an aminobenzyl group (isomers of $NH_2C_6H_4CH_2-$), a pyridyl group (isomers of $NC_5H_4$), a hydrazino group ($NH_2NH-$), and an oxopyrrolidinyl group (isomers of $NOC_4H_6$).

44. A lithium sulfur secondary battery according to claim 40, wherein said polyacetylene compound is expressed by a general chemical formula:

$$-(CH=CX-)_n-$$

wherein X is a basic group selected from the group consisting of an amino group ($NH_2-$), an aminomethyl group ($NH_2CH-$), an aminoethyl group ($NH_2CH_2CH_2-$, $CH_3CH(NH_2)-$), an amino-n-bythyl group ($NH_2CH_2CH_2CH_2-$, $CH_3CH(NH_2)CH_2$, $CH_3CH_2CH(NH_2)-$), a methyaminomethyl group ($CH_3NHCH_2-$), an aminophenyl group (isomers of NH₂C₆H₄—), an aminomethylphenyl group (isomers of C₆H₃(CH₃)(NH₂)—), an aminobenzyl group (isomers of NH₂C₆H₄CH₂—), a pyridyl group (isomers of NC₅H₄), a hydrazino group (NH₂NH—), and an oxopyrrolidinyl group (isomers of NOC₄H₆).

45. A lithium sulfur secondary battery according to claim 35, wherein said sulfide compound is selected from the group consisting of a disulfide compound and a polysulfide compound having two or more successive sulfur-sulfur bonds.

46. A lithium sulfur secondary battery according to claim 36, wherein said sulfide compound is selected from the group consisting of a disulfide compound and a polysulfide compound having two or more successive sulfur-sulfur bonds.

47. A lithium sulfur secondary battery according to claim 37, wherein said sulfide compound is selected from the group consisting of a disulfide compound and a polysulfide compound having two or more successive sulfur-sulfur bonds.

48. A lithium sulfur secondary battery according to claim 38, wherein said sulfide compound is selected from the group consisting of a disulfide compound and a polysulfide compound having two or more successive sulfur-sulfur bonds.

49. A lithium sulfur secondary battery according to claim 39, wherein said sulfide compound is selected from the group consisting of a disulfide compound and a polysulfide compound having two or more successive sulfur-sulfur bonds.

50. A lithium sulfur secondary battery according to claim 40, wherein said sulfide compound is selected from the group consisting of a disulfide compound and a polysulfide compound having two or more successive sulfur-sulfur bonds.

51. A lithium sulfur secondary battery according to claim 35, further comprising:
 a cathode can whose internal face is in contact with a first face of said cathode;
 an anode can whose internal face is in contact with a first face of said anode;
 wherein the separator includes an insulating porous material sandwiched between second faces of said cathode and said anode; and
 wherein the secondary battery further comprises an insulating packing secured to an internal wall of said cathode can for preventing said cathode from contacting said anode can.

52. A lithium sulfur secondary battery according to claim 51, wherein said separator is made of a non-woven fabric.

53. A battery material for a non-aqueous battery comprising:
 an electrode substrate material; and
 a film of a basic polymer compound applied on said electrode substrate material, said basic polymer carrying a sulfide compound as an active material.

54. A battery material according to claim 53, wherein said basic polymer compound is a polyvinyl compound.

55. A battery material according to claim 53, wherein said basic polymer compound is a polyacetylene compound.

56. A battery material according to claim 53, wherein said electrode substrate material is selected from the group consisting of gold (Au), platinum (Pt), silver (Ag), nickel (Ni), titanium (Ti), glassy-carbon, palladium (Pd), copper (Cu), iron (Fe), indium (In), tungsten (W) and graphite.

57. A battery material according to claim 54, wherein said electrode substrate material is selected from the group consisting of gold (Au), platinum (Pt), silver (Ag), nickel (Ni), titanium (Ti), glassy-carbon, palladium (Pd), copper (Cu), iron (Fe), indium (In), tungsten (W) and graphite.

58. A battery material according to claim 55, wherein said electrode substrate material is selected from the group consisting of gold (Au), platinum (Pt), silver (Ag), nickel (Ni), titanium (Ti), glassy-carbon, palladium (Pd), copper (Cu), iron (Fe), indium (In), tungsten (W) and graphite.

59. A battery material according to claim 54, wherein said polyvinyl compound is expressed by a general chemical formula:

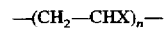
—(CH₂—CHX)ₙ— wherein X is a basic group selected from the group consisting of an amino group (NH₂—), an aminomethyl group (NH₂CH—), an aminoethyl group (NH₂CH₂CH₂—, CH₃CH(NH₂)—), an amino-n-bythyl group (NH₂CH₂CH₂CH₂—, CH₃CH(NH₂)CH₂, CH₃CH₂CH(NH₂)—), a methyaminomethyl group (CH₃NHCH₂—), an aminophenyl group (isomers of NH₂C₆H₄—), an aminomethylphenyl group (isomers represented by chemical formula C₆H₃(CH₃)(NH₂)—), an aminobenzyl group (isomers of NH₂C₆H₄CH₂—), a pyridyl group (isomers of NC₅H₄), a hydrazino group (NH₂NH—), and an oxopyrrolidinyl group (isomers of NOC₄H₆).

60. A battery material according to claim 57, wherein said polyvinyl compound is expressed by a general chemical formula:

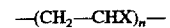
—(CH₂—CHX)ₙ— wherein X is a basic group selected from the group consisting of an amino group (NH₂—), an aminomethyl group (NH₂CH—), an aminoethyl group (NH₂CH₂CH₂—, CH₃CH(NH₂)—), an amino-n-bythyl group (NH₂CH₂CH₂CH₂—, CH₃CH(NH₂)CH₂, CH₃CH₂CH(NH₂)—), a methyaminomethyl group (CH₃NHCH₂—), an aminophenyl group (isomers of NH₂C₆H₄—), an aminomethylphenyl group (isomers of C₆H₃(CH₃)(NH₂)—), an aminobenzyl group (isomers of NH₂C₆H₄CH₂—), a pyridyl group (isomers of NC₅H₄), a hydrazino group (NH₂NH—), and an oxopyrrolidinyl group (isomers of NOC₄H₆).

61. A battery material according to claim 55, wherein said polyacetylene compound is expressed by a general chemical formula:

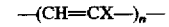
—(CH=CX—)ₙ— wherein X is a basic group selected from the group consisting of an amino group (NH₂—), an aminomethyl group (NH₂CH—), an aminoethyl group (NH₂CH₂CH₂—, CH₃CH(NH₂)—), an amino-n-bythyl group (NH₂CH₂CH₂CH₂—, CH₃CH(NH₂)CH₂, CH₃CH₂CH(NH₂)—), a methyaminomethyl group (CH₃NHCH₂—), an aminophenyl group (isomers of NH₂C₆H₄—), an aminomethylphenyl group (isomers represented by chemical formula C₆H₃(CH₃)(NH₂)—), an aminobenzyl group (isomers of NH₂C₆H₄CH₂—), a pyridyl group (isomers of NC₅H₄), a hydrazino group (NH₂NH—), and an oxopyrrolidinyl group (isomers of NOC₄H₆).

62. A battery material according to claim 58, wherein said polyacetylene compound is expressed by a general chemical formula:

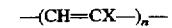
—(CH=CX—)ₙ— wherein X is a basic group selected from the group consisting of an amino group (NH₂—), an aminomethyl group ($NH_2CH-$), an aminoethyl group ($NH_2CH_2CH_2-$, $CH_3CH(NH_2)-$), an amino-n-bythyl group ($NH_2CH_2CH_2CH_2-$, $CH_3CH(NH_2)CH_2$, $CH_3CH_2CH(NH_2)-$), a methyaminomethyl group ($CH_3NHCH_2-$), an aminophenyl group (isomers of $NH_2C_6H_4-$), an aminomethylphenyl group (isomers of $C_6H_3(CH_3)(NH_2)-$), an aminobenzyl group (isomers of $NH_2C_6H_4CH_2-$), a pyridyl group (isomers of $NC_5H_4$), a hydrazino group ($NH_2NH-$), and an oxopyrrolidinyl group (isomers of $NOC_4H_6$).

63. A battery material according to claim 53, wherein said sulfide compound is selected from the group consisting of a disulfide compound and a polysulfide compound having two or more successive sulfur-sulfur bonds.

64. A battery material according to claim 54, wherein said sulfide compound is selected from the group consisting of a disulfide compound and a polysulfide compound having two or more successive sulfur-sulfur bonds.

65. A battery material according to claim 55, wherein said sulfide compound is selected from the group consisting of a disulfide compound and a polysulfide compound having two or more successive sulfur-sulfur bonds.

66. A battery material according to claim 56, wherein said sulfide compound is selected from the group consisting of a disulfide compound and a polysulfide compound having two or more successive sulfur-sulfur bonds.

67. A battery material according to claim 57, wherein said sulfide compound is selected from the group consisting of a disulfide compound and a polysulfide compound having two or more successive sulfur-sulfur bonds.

68. A battery material according to claim 58, wherein said sulfide compound is selected from the group consisting of a disulfide compound and a polysulfide compound having two or more successive sulfur-sulfur bonds.

\* \* \* \* \*